United States Patent

[11] 3,588,795

| [72] | Inventors | Stathis G. Linardos<br>Clearwater;<br>Richard F. Elmhurst; William A. Elmhurst,<br>Largo, Fla. |
|---|---|---|
| [21] | Appl. No. | 802,998 |
| [22] | Filed | Feb. 27, 1969 |
| [45] | Patented | June 28, 1971 |
| [73] | Assignee | Lykes Bros. Incorporated, Systems &<br>Engineering Division<br>Clearwater, Fla. |

[54] DEPTH INDICATOR
11 Claims, 10 Drawing Figs.

[52] U.S. Cl. .................................................. 340/3
[51] Int. Cl. ................................................. G01s 9/68
[50] Field of Search ..................................... 340/1, 1
(C), 3

[56] References Cited
UNITED STATES PATENTS
2,780,795  2/1957  Ambrosio .................... 340/3

3,223,965  12/1965  Beebe ................................. 340/3
3,307,143  2/1967  Wyse et al ........................... 340/3
3,437,986  4/1969  Noble ................................. 340/3

*Primary Examiner*—Richard A. Farley
*Attorney*—Stefan M. Stein

ABSTRACT: A solid-state indicator for indicating a depth of water featuring a digital readout display which is accurate, easily read, and draws a minimum amount of current. The indicator includes an automatic gain that is automatically stepped upwardly together with a newly transmitted sound wave when a previous sound wave has still not been received. Also provided is an automatic alarm that is simply actuated by connecting the alarm to the digital outputs of the counters. The alarm is set at a particular depth and is sounded whenever the counters are stopped by a reflected sound wave at a depth of water below this setting.

Patented June 28, 1971  3,588,795

INVENTOR.
STATHIS G. LINARDOS
RICHARD F. ELMHURST
WILLIAM A. ELMHURST
BY
Stefan M. Stein
atty.

INVENTOR.
STATHIS G. LINARDOS
RICHARD F. ELMHURST
WILLIAM A. ELMHURST

DEPTH INDICATOR

This invention relates to a depth indicator for measuring distances in liquids; more particularly the invention relates to a depth indicator for measuring distances in liquids with a digital readout display.

A recent development in depth indicators is the provision of a digital readout display to indicate the depth of water. Such a digital display is shown in U.S. Pat. No. 3,307,143. As denoted in this patent, a digital display for a depth indicator has many advantages over previous displays such as the meter readout type, the flying neon type, an the oscilloscope readout type. The most important of these advantages is that a viewer can quickly and easily read a depth of water directly, even at a distance, and the accuracy with which the depth of water is displayed is greatly increased.

There are, however, a number of objectionable features of present depth indicators with digital displays which need to be improved upon. One objectionable feature is that since the display tubes are of the cathode type, they require an excessive amount of current. As a consequence, the current drain of the entire depth indicator is increased. This is important, particularly in small boats, because the depth indicator is normally operated from a storage battery. If the current drain is high, the battery has to be frequently recharged which is not only a nuisance but also expensive.

Another objectionable feature is that present digital display depth indicators use tubes instead of transistors. This makes the depth indicator bulkier than necessary. If it were more compact, the depth indicator would be easier to install in the cockpit of a sailing boat or on the bridge of a small boat where only a minimum amount of space is available.

Still another objectionable feature is that present indicators fail to have a simple means to automatically control the gain of the amplifier to reject spurious signals such as occurs when a vessel is over a bed of seaweed.

Another objectionable feature is that since usually only one transducer is provided, present depth indicators are confronted with the problem of residual transducer vibrations which occur after the sound wave has been pulsed. These can be picked up by the amplifier and relayed to the digital display whereupon an erroneous reading results.

Another objectionable feature is that present indicators do not include an automatic alarm which is simply operated yet effective and accurate for sounding an alarm when the vessel is within a particular depth of water.

Accordingly, it is an object of this invention to provide a depth indicator for indicating a depth of water with a digital display which is highly accurate and which can be read quickly in digital form without the normal requirement of interpolation.

Another object is to provide a depth indicator which has a solid-state circuitry, which has a minimum power requirement, and which can be operated directly from a standard 12 volt storage battery.

Still another object is to provide a depth indicator which is extremely compact and therefore can be placed in limited areas of the vessel making it especially suitable for pleasure craft.

A further object is to provide a depth indicator which with a digital display can be shifted from one range to another, for example, from feet to fathoms, by merely changing the frequency rate of a time-pulse generator.

A still further object is to provide a depth indicator with two transducers to avoid spurious signals from residual vibrations of a transmitting transducer.

Another object is to provide a depth indicator with an automatic gain, which is increased simultaneously with each sound wave for each cycle of the indicator's system.

Another object is to provide a depth indicator which can be combined with a remote display by electrically connecting the remote display to a main display without the need of mechanical components such as a servomechanism.

Another object is to provide a digital display which provides high intensity light making the numbers easy to read even under adverse ambient light conditions.

Another object is to provide a depth indicator with an automatic depth alarm which is simply actuated by output pulses of a counter in response to a particular depth of water.

Another object is to provide a depth indicator which can be utilized with a printer type readout wherein a continual record of the depth is automatically made.

Another object is to provide a depth indicator which can be economically marketed to provide an inexpensive but reliable indicator for the purchaser.

Other objects of the invention will in part be obvious and will in part appear hereinafter.

In accordance with these objects, the invention comprises a depth indicator for displaying a depth of water in digital form. To cycle the system of the depth indicator, a signal generator produces a starting signal approximately once every 4 seconds. In response to this signal and time pulses emitted by a time base oscillator whose frequency is adjusted to the speed of sound in water, the following events initially occur simultaneously: binary counters for counting the time base pulses are first reset then count the pulses, a transmitting transducer transmits a sound wave or sounding pulse into the water, and an amplifier for receiving the reflected sound wave is blanked during the transmission to prevent spurious signals from affecting the system. When the sound wave is reflected back to a receiving transducer and amplified, it stops the counters. Separate transmitting and receiving transducers are provided to prevent residual vibrations of the transmitting transducer from being received by the amplifier. When the counters are stopped, they have counted the pulses emitted from the time-base oscillator since the sound wave has been transmitted and received. Since the time-base oscillator has a pulse rate which is correlated to the speed of sound in water, the number of counted pulses is equivalent to the water's depth. The depth will be in feet or fathoms depending on the frequency rate of the oscillator and the counter's outputs are electrically connected to a digital display for displaying the depth of water. The display used is shown in U.S. Pat. No. 3,210,876. It remains visible until a second starting signal is emitted from the signal generator at which time the counters are reset and the system recycled. However, if the counters count up to 999, the maximum depth of water capable of being counted, and the sound wave has still not been received, a retriggering pulse is emitted from the counter. In response to this retriggering pulse, the gain of the amplifier is stepped up by an automatic gain and a second sounding pulse or sound wave is transmitted. The counters once again begin to count the pulses from the time the second sound wave has been transmitted. If a sound wave has still not been received by the receiving transducer after the counters have again counted 999 pulses, a second retriggering pulse is emitted to step the automatic gain to its second level, to once again send out a sound wave through the transmitting transducer, and to start the counters counting the pulses. This retriggering cycle is repeated for a third amplification gain if a sound wave has still not been received during the second retriggering cycle.

If at anytime, the sound wave is received, the counters will be stopped and a corresponding depth of water displayed until the signal generator presents a new starting signal for recycling the system. Conversely, if the sound wave is not received, nothing will be displayed. At the end of 4 seconds, the signal generator will send out a new starting signal which resets the automatic gain to its initial level and the system is recycled.

A depth alarm is also provided with the depth indicator. This depth alarm is connected to the outputs of the digital counters and is actuated by the counters whenever they are stopped by a depth of water which is below that selected by an adjustable alarm switch.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
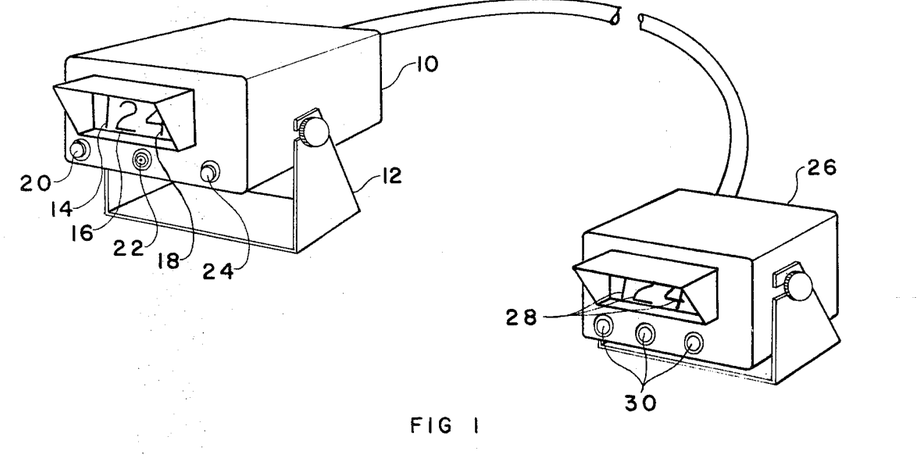
FIG. 1 is a perspective view of the digital display of the depth indicator of the invention.

Referring now to the drawings in detail, there is illustrated in FIG. 1 a preferred embodiment of a main display cabinet 10 for the depth indicator of this invention. The display cabinet 10 is pivotally mounted to a stand 12 and is adjustable to direct a units digit 14, a tens digit 16, and a hundreds digit 18 to an eye of a viewer. The digits indicate a depth of water being sounded and although only three are shown, it is to be understood that any desired number thereof may be provided. A depth alarm switch 20 is provided to be set to a depth of water at which an alarm is to be sounded through a buzzer 22. Although the depth indicator incorporates an automatic gain, conveniently, provision is also made to manually regulate the gain by a sensitivity control 24.

One or more remote displays 26 may be electrically connected to the main display cabinet 10 for indicating the depth of water in other compartments of the vessel. The cabinet of the remote display is pivotally mounted similarly to the main display 10. Digits 28 are provided on the remote display to correspond with digits 14, 16, and 18 of a main display. Also provided is a series of lamps 30 connected to the depth alarm switch 20. These lamps indicate the particular depth selected by the depth alarm switch 20 located on the main display 10.

Figure 2:
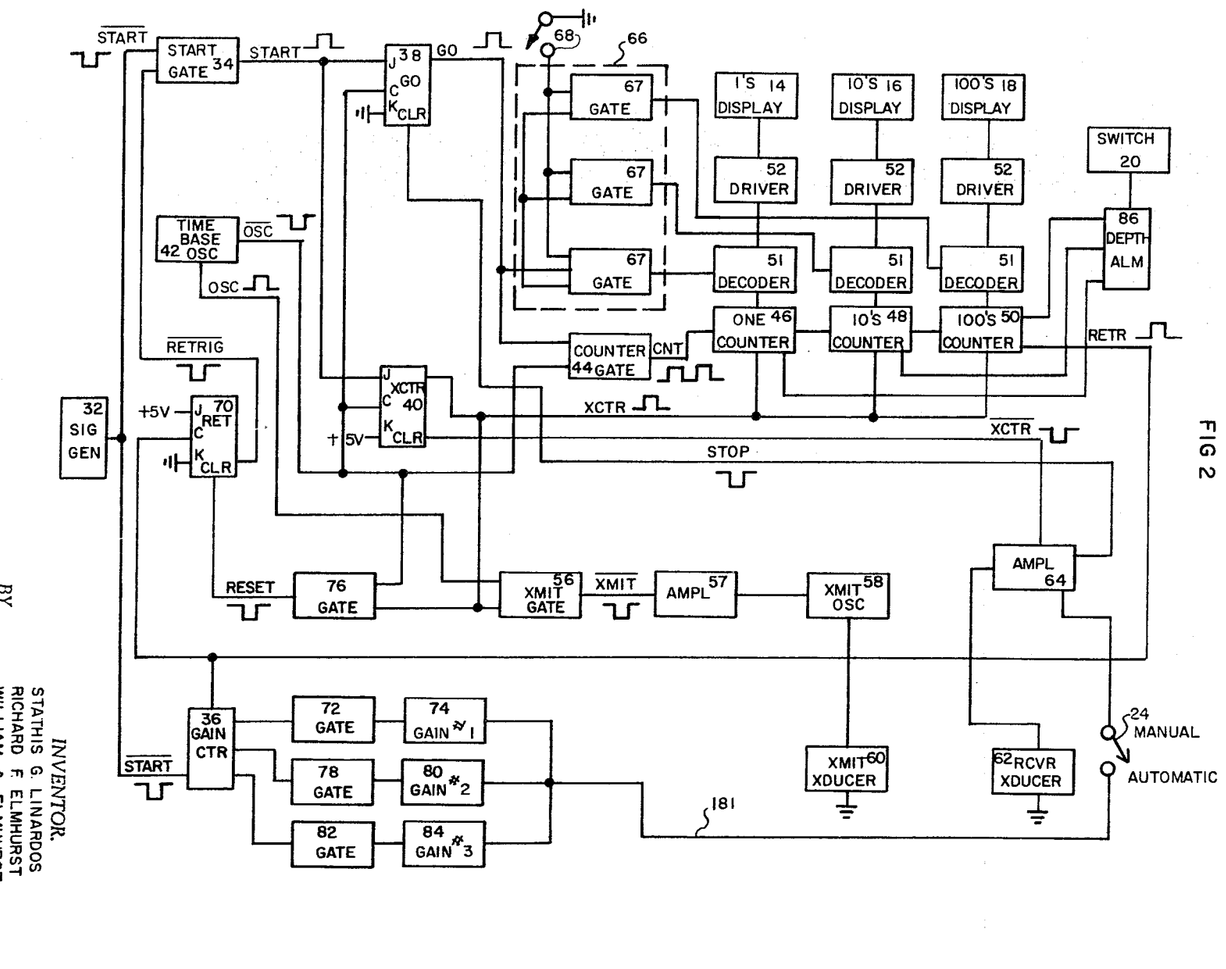
FIG. 2 is a block schematic of the electrical system of the invention.
Figure 3:
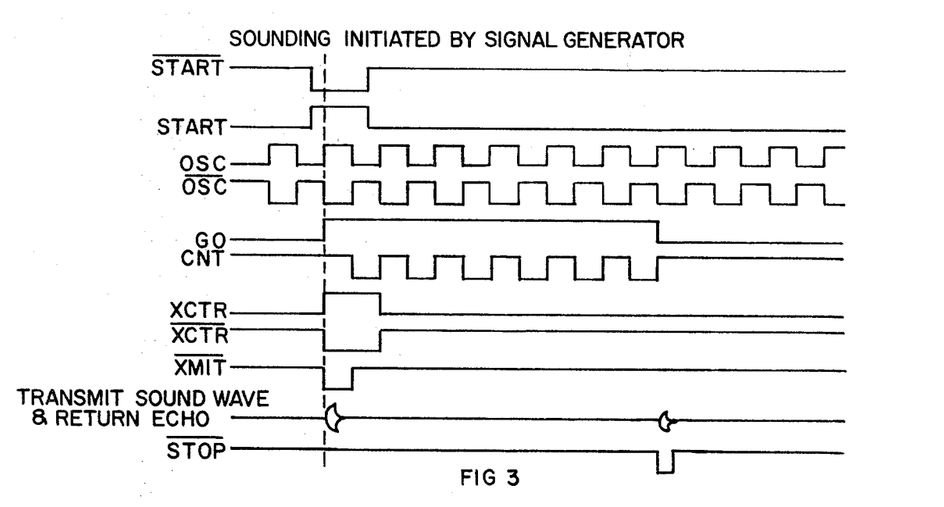
FIG. 3 is a timing diagram of the pulses which are produced at various points within the system by a sounding initiated by the signal generator.

The operation of the depth indicator will now be described with reference to FIG. 2, a block diagram of its system and with reference to FIG. 3, the timing diagram of the pulses and signals produced at various points in system initiated by the signal generator.

The sounding rate of the system, and the duration of time which a particular depth is displayed is determined by the pulse rate of a signal generator 32 comprising a relaxation oscillator which is hereinafter more fully described. The oscillator is driven by a 12 volt DC source through a variable rheostat 33. The resistance of rheostat 33 determines the RC time constant and consequently the pulse rate of the oscillator. It has been found by experiment that an optimum pulse rate is one pulse for every 4 seconds. Rheostat 33 may be located on the main display cabinet 10 to vary the pulse rate if this is so desired.

The pulse emitted from the signal generator 32 is negative and is designated a negative start signal ($\overline{start}$). It is simultaneously transmitted to a NAND gate 34, also designated a start gate, and automatic gain counter 36.

Start gate 34 is arranged to produce a positive pulse designated a positive start pulse (start) when the negative start signal appears at its input. From gate 34 the positive start pulse simultaneously enters the J terminals of the Go flip-flop 38 and a transmitter flip-flop 40, both of which are conventional JK flip-flops.

At this point of the discussion, it is now appropriate to consider time-base oscillator 42. This oscillator is conventional and any number of different types of oscillators may be utilized providing they are capable of putting out a positive and negative complementary pulse at a fixed pulse frequency of either 2400 cycles per second or 400 cycles per second. The negative pulse of the output of oscillator 42 is designated a negative OSC pulse ($\overline{OSC}$) and the positive pulse is designated a positive OSC pulse (OSC). A typical oscillator which may be utilized is an astable multivibrator as shown and described on pages 377—380, "Transistor Circuit Design," published by Texas Instruments (1963). The frequency of oscillation can be adjusted to 2400 or 400 cycles per second by proper selection of the timing capacitors.

The primary function of the oscillator is to provide a pulse frequency for stepping a binary counter which measures the depth of water. This pulse frequency is selected to correspond with the speed in which sound travels in water which is 4800 feet per second. The pulse frequency of 2400 cycles per second measures the depth of water in feet and the frequency of 400 cycles per second measures it in fathoms as further explained below.

As is well understood, a sonic depth indicator measures the depth of water by sending out a sound wave which is returned to the indicator after it is reflected from the ground beneath the water. The time it takes for the signal to return is equated to the depth of water. Thus, a pulse frequence of 2400 cycles per second means that one pulse is emitted for every 2 feet that sound travels in water. Since the sound wave must travel twice the depth of water, it should therefore be obvious that each pulse at this frequency is equivalent to one foot of the water's depth.

Similarly, to measure a depth of water in fathoms, oscillator 42 can be switched to its 400 cycle frequency which provides an output pulse for every 2 fathoms, 12 feet, that the sound travels in water. Each pulse at this frequency is equivalent to 1 fathom of the water's depth. Thus, as will become more apparent, the depth indicator is capable of measuring the depth of water in feet or fathoms by simply adjusting the pulse frequency of oscillator 42.

Now that the time oscillator and its function has been described, it will now be shown how its pulses are passed to the counters.

The negative oscillator pulse is sent simultaneously to the clock terminals of the Go and Transmitter (SCTR) flip-flops 38 and 40, and to the input of NAND gate 44, also designated a counter gate. When Go flip-flop 38 received this pulse, coincident with the start pulse, its output becomes positive producing a positive signal designated Go, which is transmitted to the input of counter gate 44. When gate 44 is receiving the Go signal, each time a negative OSC pulse is also received, a positive pulse is produced at its output. This positive pulse is designated a counterpulse (CNT).

Figure 5:
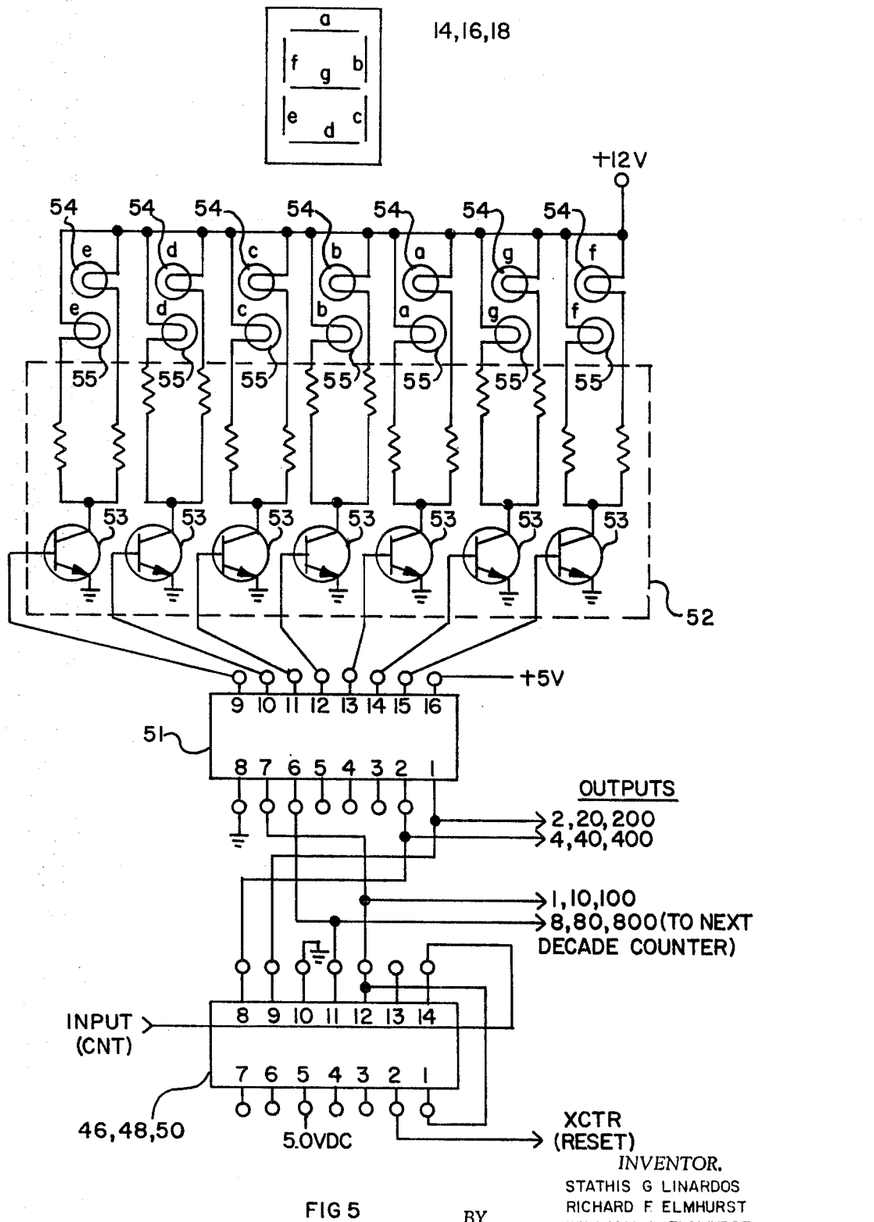
FIG. 5 is an electrical schematic showing how the counters are connected to the digital display.

The counterpulse is relayed to digital counters 46, 48 and 50 which are respectively associated with the units digits 14, tens digits 16, and hundreds digits 18 of the display 10. Each counter is electrically connected to its digital display through a decoder 51 and a driver 52. The counters 46, 48 and 50 and the decoders 51 are all conventional elements well known by those knowledgeable in the art. Although a number of different types of equivalent components may be substituted, presently the depth indicator is being made with integrated-circuit counters having a part number SN 7490N manufactured by Texas Instruments and integrated circuit decoders having a part number U6B930759X manufactured by Fairchild Semiconductor. Since they are well known, only a brief summary of their operation will be given rather than a laborious detailed description which adds nothing to the knowledge of the public and which increased rather than alleviates the task of understanding this invention. An electrical schematic of the manner in which the components are wired is shown in FIG. 5.

Each digital counter has binary-coded-decimal (BCD) outputs corresponding to the numbers 0 through 9. In a customary manner, the counters are stepped upwardly one increment by each counterpulse (CNT). As they step upwardly, a positive electrical signal is generated at the outputs which correspond to the number of counted pulses. Each time an electrical signal appears at the output representing number 9 of counter 46, the signal is transmitted to counter 48 to step this counter. Similarly, each time an electric signal is emitted on output 9 of counter 48, the signal is transmitted to the hundreds counter 50. In this manner, the counters can count up to a maximum of 999 pulses which represents the depth of water in feet or fathoms depending upon the frequency of oscillator 42.

Each digital display 14, 16 and 18 is a numeric readout module, manufactured by Dialco and patented in U.S. Pat. No. 3,210,876. The teachings of this patent are incorporated by reference into this application. The module is comprised of seven incandescent tubular lamps suitably arranged in a housing to illustrate the numbers 0 through 9. Each number is illustrated by lighting only the lamps which form the number. The seven lamps, reference a—g, are shown connected to driver 52 in FIG. 5. These displays are particularly advantageous as they provide high intensity light, making the numbers easy to read even under adverse ambient light conditions, yet have a long life and low current consumption.

The function of each decoder 51 is to translate the BCD output of its counter into a seven-segment-coded signal to light the appropriate lamps of the display to produce a corresponding numerical character.

Drivers 52 are provided to amplify the seven-segment-coded signal from decoders 51 to a magnitude sufficient to light the incandescent lamps in the numerical displays 14, 16 and 18. Each driver 52 contains seven NPN transistors 53 whose bases are connected directly to the output of a corresponding decoder 51 as shown in FIG. 5. When a positive signal appears at one of the seven outputs of decoder 51, current flows into the connected base of a transistor 53, causing that transistor to conduct. When transistor 53 conducts, current flows through its associated lamp 54 in the numerical display 14, 16 and 18 in the main display 10, causing it lamp to light. The digits 28 on remote display 26 are represented by lamps 55 which are in parallel with lamps 54 and are lit in a similar manner. It should be obvious that additional remote displays can be provided by connecting their digital display lamps in parallel with lamps 54 and 55.

The positive XCTR signal is sent to a NAND gate or transmitter gate 56 which is also connected at its input to the positive OSC signal of oscillator 42. When the both the positive XCTR signal and a positive OSC pulse are present at the input of transmitter gate 56, a negative pulse is produced at the gate's output. This pulse designated a negative transmitter pulse ($\overline{XMIT}$) is amplified by transmitter amplifier 57 and afterwards altered by transmitter oscillator 58, a conventional transistorized pulse Hartly oscillator, into a 200 kc. sinusoidal signal for firing transmitting transducer 60. When fired, transducer 60 transmits the 200 kc. signal or sound wave into the water.

At the same time transducer 60 is transmitting the sound wave, the XCTR positive signal also resets the counters 46, 48 and 50 to insure that they will all be in the zero position or start position when the sound wave is sent out. After being reset, the counters immediately start counting as seen by the time diagram of FIG. 3.

A receiving transducer 62 is provided to receive the reflected sound wave which is then amplified by a receiving amplifier 64. After being amplified, the received signal stops the counters.

The negative $\overline{XCTR}$ signal, as will become apparent, blanks the amplifier output during the time transducer 60 is pulsating and immediately thereafter to prevent the sound wave from being received, amplified and transmitted to stop the counters during this period. If a signal were transmitted to the counters, a spurious display would result.

It is important to note that two transducers are provided. Two transducers overcome the inherent problem that occurs in previous depth indicators where only one transducer is provided and functions reciprocally as a transmitting and receiving transducer. This problem being that after a transducer is pulsed, it cannot be attenuated quickly enough to overcome natural residual vibrations which continue for a substantial period of time. Therefore, if the transmitter transducer is also a receiving transducer, these residual vibrations could be picked up by the receiving amplifier and amplified to cause the indicator to present a spurious display reading. By providing two transducers, the receiving transducer is not effected by the vibrations of the transmitting transducer and these spurious display readings are eliminated.

When the sound wave is received, the signal that is emitted from the amplifier to stop the counters is negative and designated a negative stop pulse ($\overline{stop}$). As mentioned, the counters are arranged to be stopped when they receive this pulse. The negative stop pulse is delivered to the clear terminal of Go flip-flop 38 to remove its positive go signal. Thus, the Go signal is also removed at counter gate 44. Consequently, when this occurs, the gate blocks the negative oscillator pulse and no counter pulse is produced at its output to step the counter. The counter is immediately stopped and the number of pulses counted which correspond to the depth of water are displayed by digits 14, 16 and 18.

These digits remain on display until another negative start signal is generated from signal generator 32 (approximately 4 seconds) at which time a new sounding is initiated and the above described action is repeated.

Provision is made to blank the displays 14, 16 and 18 when counting. Before the negative stop pulse is received to stop the counters, the counters, because they are being rapidly stepped by the counterpulses, could cause the displays 14, 16 and 18 to rapidly blink on and off or scramble. To prevent this, a display blanking module 66 is provided. Blanking module 66 simply comprises three conventional NAND gates 67. The output of each gate leads to a respective decoder 51. One of the inputs of the NAND gates 67 is connected to the output of Go flip-flop 38. While the Go signal is present, the blanking gates 67 transmit a negative blanking pulse to decoders 51 to blank displays 14, 16 and 18. The blanking pulse prevents the signals from the outputs of counters 46, 48 and 50 from passing through the decoders 51. When the Go signal is erased by the negative stop signal, the blanking signal at the output of the NAND gate is eliminated. The digital display lamps are then lit and may be read.

However, some operators may prefer to have the display scrambling while the counters are counting because it indicates the system is in the process of sounding a new depth. To provide both blanking and nonblanking flexibility, a simple switch 68 may be provided in a ground lead to the input of gates 67. The switch is placed in a position to connect the gates to ground when scrambling is desired and blanking module 66 is to be deactivated. When connected to ground, the blanking signal is not present at the output of NAND gates 67.

Figure 4:
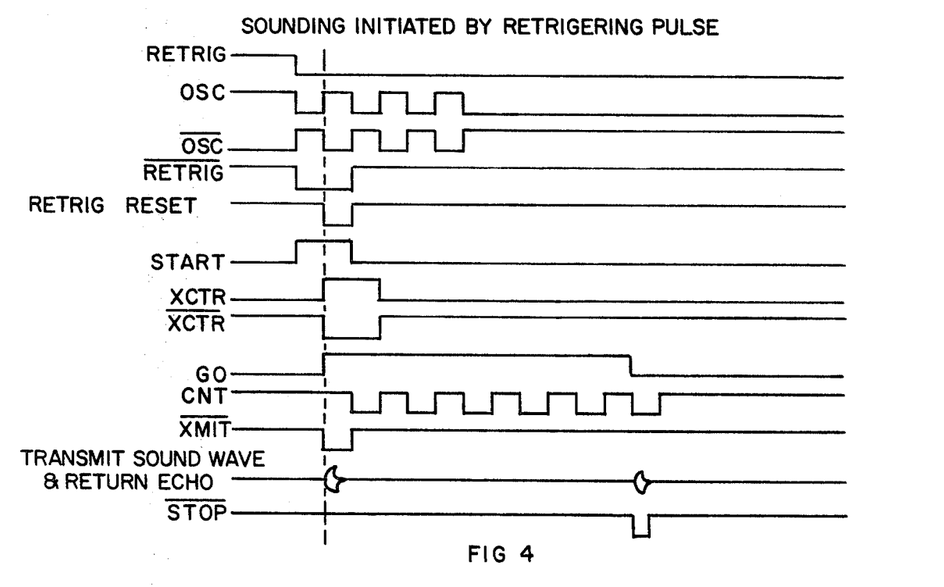
FIG. 4 is a timing diagram of the pulses which are produced at various points in the system by a retriggering pulse.

Up to this point, we have considered the operation of the detector system when a sound wave is received by the receiving transducer during the first cycle of the counters. The discussion will now turn to the situation where the counters have counted up to 999 and the sound wave has still not been received. At this time, in response to a retriggering signal, the system is recycled. As this occurs, transducer 60 transmits a second sound wave and the gain of the amplifier is increased automatically by the provision of an automatic gain. The timing diagram of FIG. 4 should be referred to while reviewing the below explanation of the retriggering cycle.

When counter 50 changes from number 9 to 0, which means the counter has counted 999 pulses, and the first transmitted sound wave has still not been received, a negative-going signal at the output of counter 50 is used to increase the gain of the amplifier and recycle the system. This negative-going signal is derived from the 8 position of the BCD output of counter 50 and is designated a retriggering signal (Retrig) and is simultaneously transmitted to the clocking input of the automatic gain counter 36 and to the clocking input of a retriggering flip-flop 70, a conventional JK flip-flop.

As will be later described in more detail, when automatic gain counter 36 receives the positive retriggering pulse, it sends a signal through gate 72 to activate a first gain level 74 of amplifier 64. Thus, the amplifier is now prepared to receive and transmit a weaker signal than heretofore.

Simultaneously, when the negative-going retriggering pulse appears at the input of the retriggering flip-flop 70, a negative pulse designated a negative retriggering pulse ($\overline{Retrig}$), is produced at the output of the flip-flop and is transmitted to start gate 34. When start gate 34 receives this pulse, it produces a positive start pulse at its output in the same manner as it did when it received the negative start signal from signal generator 32. As a result, the system is recycled. As previously described, the counters are reset and begin to count, transmitting transducer 60 transmits a second sound wave, and the amplifier 64 is blanked and afterwards prepared to receive the sound wave with its higher gain. In addition, the negative OSC pulse from time-pulse oscillator 42 is also sent to a reset NAND gate 76 along with the positive XCTR signal from flip-flop 40. When reset gate 76 receives both of these pulses at its input, a negative pulse designated a retriggering reset pulse ($\overline{reset}$) is produced at its output to disarm retriggering flip-flop 70 and thereby erase the negative retriggering signal ($\overline{Retrig}$) at its output.

If the second transmitted sound wave has still not been received to stop the counters after the counters have once again counted 999 pulses, a second retriggering pulse is produced at the output of counter 50. Similar to the effect of the first retriggering pulse, the second retriggering pulse steps up the automatic gain as it is received by counter 36 and transmitted through NAND gate 78 to raise the gain of amplifier 64 to a second gain level 80. As before, the second retriggering pulse will also cause retriggering flip-flop 70 to produce a negative retriggering pulse at its output. As a result of this retriggering pulse, exactly as previously described, the system is once again recycled and the counters are reset, a third sound wave is transmitted by the transmitting transducer 60 and the counters again count the pulses from the time the sound wave is transmitted.

Should the counters again count up to 999, a third retriggering pulse would be sent out by counter 50 to step the amplifier through NAND gate 82 to a third gain level 84 and with this highest gain, another sound wave is transmitted. If the reflected sound wave is still not received, a fourth retriggering pulse returns the automatic gain to its first level and subsequent retriggering pulses again restep it upwardly as previously described.

After a period of 4 seconds from the initial negative start signal produced by the signal generator 32, the signal generator will again produce a negative start signal to recycle the system and to reset gain counter 36 to the base gain level incorporated solely within the amplifier.

As should now be obvious, if at any time during the retriggering cycles a reflected sound wave is received, the counters will be stopped and the depth displayed until the signal generator again pulses and recycles the system. Switch 24 is provided to disconnect the automatic gain and incorporate a manual gain if this is desired.

Conveniently, a depth alarm 86 is provided in combination with the indicator. As will be described in more detail, the depth alarm is connected to the outputs of the counters. When a depth of water is detected which is within the depth of water selected by the depth alarm switch 20 on display cabinet 10, an audible alarm is sounded on buzzer 22 of the main display cabinet. A buzzer, mounted internally in the remote display 26 is also sounded.

The above components which are not conventional will now be described in greater detail.

Figure 6:
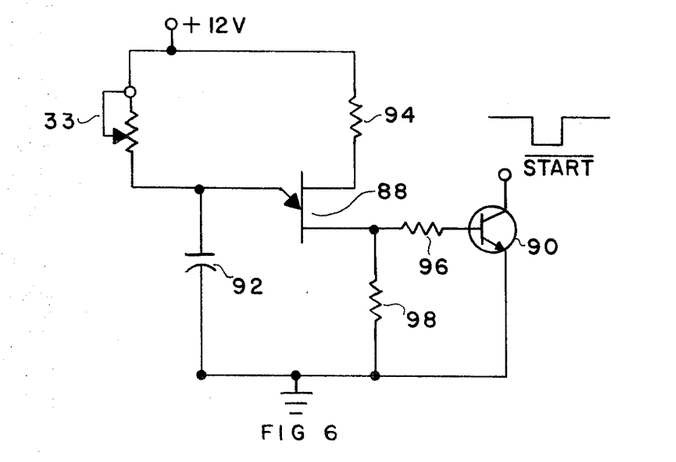
FIG. 6 is an electrical schematic of the signal generator of the system.

The signal generator 32 is shown in FIG. 6. It is a modification of a conventional relaxation oscillator. The components of the signal generator include, in addition to the variable rheostat 33, unijunction transistor 88, NPN transistor 90, capacitor 92 and resistors 94, 96 and 98. The signal generator 32 is connected to a positive 12 volts and to ground where indicated. In conformity with well-known electronic principles, the resistance of rheostat 33 multiplied by the capacitance of capacitor 92 determines the RC time constant for the firing of unijunction transistor 88 and therefore determines the cycling time of the system. This time constant may be varied by varying the resistance of rheostat 33. As mentioned, it is preferable to have the unijunction firing approximately once every 4 seconds. The firing of the unijunction produces a triangular pulse at point 100 which is shaped by resistors 96 and 98 into a square wave pulse which is presented on the base of transistor 90. At this time, transistor 90 conducts producing at its collector terminal the negative start signal or square wave pulse that starts and cycles the system. Transistor 90 also acts as a driver to increase the magnitude of the square wave pulse appearing at its base for operating the system. Resistor 94 acts as a current limiter to protect unijunction transistor 88.

Figure 7:
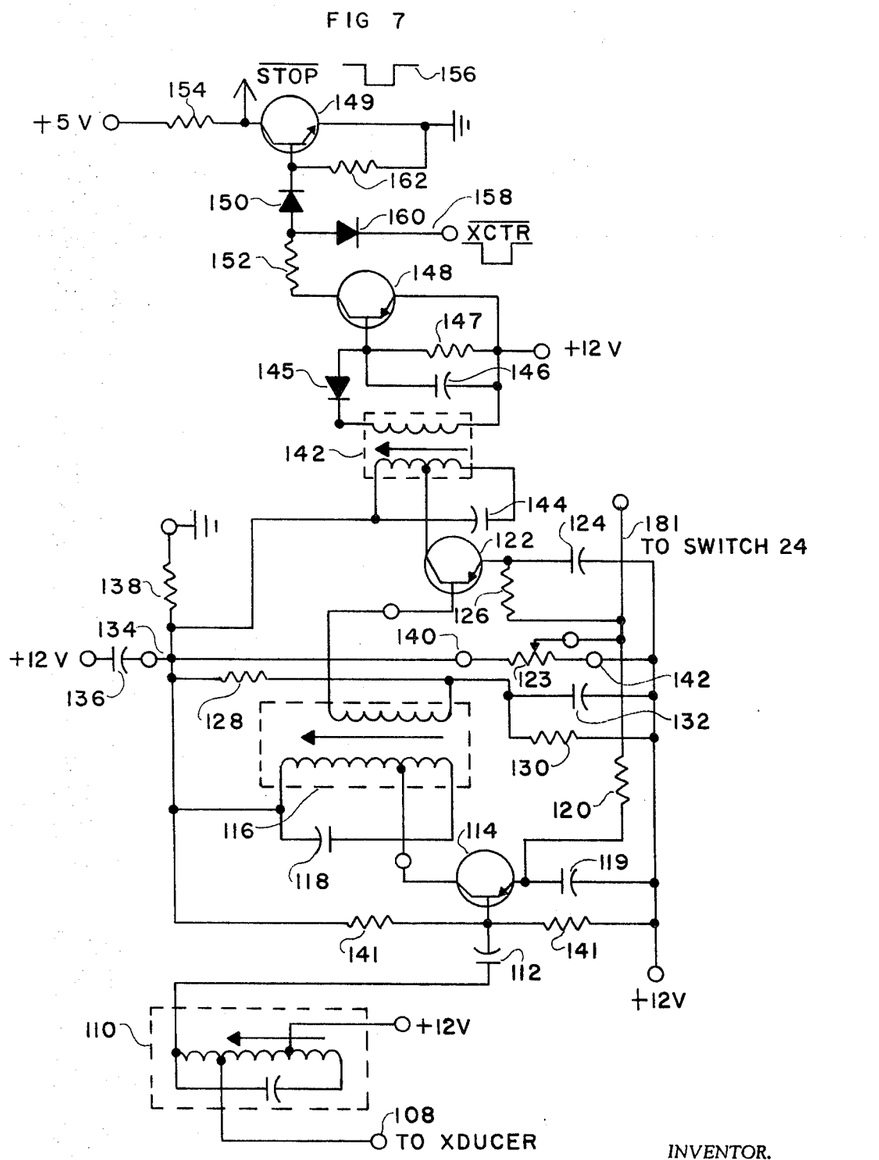
FIG. 7 is an electrical schematic of the receiving amplifier of the system.

The receiving amplifier 64 will now be described in greater detail. Reference should be made to FIG. 7 which shows a detailed schematic of its circuitry. Tracing the circuitry of the amplifier includes a tank circuit 110 for rejecting all frequencies with the exception of the 200 kc. frequency sound wave transmitted by the transmitting transducer 60. When the 200 kc. pulse is received by the receiving transducer 62, it appears at point 108 and is passed through the tank circuit 110 and then through a decoupling capacitor 112 to the base of a PNP transistor 114. Transistor 114 is connected in the circuit as a tuned amplifier having a parallel connected band-pass output filter comprising a transformer 116 tuned to the desired resonant frequency by a capacitor 118 with the tuned circuit being connected in the collector circuit of transistor 114 as shown. Consequently, this first stage of the receiver functions to amplify electrical pulse signals in a predetermined frequency bandwidth centered at 200 kc. and to reject all other frequencies. The first state transistor 114 is provided with the customary AC bypass capacitor 119 connected from its emitter terminal to plus 12 volts and a DC bias resistor 120 for controlling the DC bias of the transistor connected to this positive voltage either through the center tap of potentiometer 123 or through the automatic gain circuitry as will become more apparent.

From the output of the first stage existing across the secondary winding of transformer 116, the 200 kc. pulse is directed to the base of a second stage transistor 122 connected as a tuned amplifier in essentially the same configuration as the first stage. This second stage transistor is also provided with an AC bypass capacitor 124 and a DC bias resistor 126 connected between the transistor's emitter terminal and the positive terminal of the 12 volt DC source in respectively the same manner as capacitor 119 and resistor 120. The secondary winding of the transformer 116 is connected across the voltage source through biasing resistors 128 and 130 for biasing the base voltage of transistor 122. Capacitor 132 acts in conjunction with resistor 130 as an RC filter for filtering any unwanted AC voltage which may appear at the base of transistor 122. To filter the DC voltage at point 134, a capacitor 136 is provided between point 134 and the positive voltage and a resistor 138 is provided between point 134 and ground. Resistor 138 and capacitor 136 function in the conventional manner as an RC filter to reduce any AC ripple voltage which may appear on the DC supply voltage. Resistors 141 provide base bias voltage for transistor 114.

The gain of the amplifier is regulated either manually or automatically by varing the DC bias resistance in the emitter to plus 12 volts circuit of transistors 114, 122. As can be readily appreciated by those skilled in the art, the gain of the first and second stages of the amplifier increases as this emitter resistance is decreased. This is due to the fact that the gain (beta) of transistors 114 and 122 increases as the base bias current increases. Base bias current increases when the emitter resistance decreases. The gain of the amplifier may be manually adjusted by control 24 on the display cabinet 10 which is mechanically connected to potentiometer 123.

The DC bias resistance is increased manually by varying the position of the center tap of potentiometer 123 by the manual sensitivity control 24 on main display 10. The center tap of the potentiometer may be adjusted from point 140 which provides maximum resistance and minimum amplifier gain to point 142 which provides minimum resistance and maximum amplifier gain.

The DC bias resistance is increased electronically by the automatic gain as will be described in greater detail when the particular circuitry is discussed infra. It should be mentioned at this time however, that switch 24 is arranged to open the circuitry and deactuate the automatic gain whenever the center tap of potentiometer 123 is in a position other than on point 140. That is, the automatic gain is included in the system only when the center tap is on point 140.

As is readily apparent when transistors 114, 122 are conducting and the automatic gain is disconnected, current flows from the emitter terminals of the transistors to the center tap of potentiometer 123 and from there through the potentiometer to the positive lead of the 12 volt DC voltage.

Transistor 122 is connected at its collector terminal to a second stage transformer 142. Transformer 142 is similar to the first stage transformer 116. That is, it is tuned to a desired resonant frequency by a capacitor 144 with the tuned circuit being connected in the collector circuit of the transistor 122 as shown.

The third stage of the amplifier receives and conditions the 200 kc. pulse emitted from the secondary winding of the second stage transformer to a square wave negative stop pulse ($\overline{stop}$) at the output. It also includes a blanking circuit for blanking the amplified pulse during the time the negative XCTR pulse is present which is coincident with the transmission of the sounding pulse. The 200 kc. pulse emitted at the secondary of the second stage transformer is rectified by a silicon rectifier 145 and filtered through a conventional filter network comprising capacitor 146 and resistor 147. A PNP transistor 148 is provided to change the filtered 200 kc. sounding pulse into an amplified square wave pulse. When the 200 kc. pulse is present at the base of the transistor 148, transistor 148 conducts current from the positive lead of the 12 volt DC source to the base of a NPN transistor 149. Inserted between the collector terminal of transistor 148 and the base of transistor 149 are a diode 150, and a base resistor 152 for protecting transistor 148 against excessive current. When transistor 148 is conducting, a positive current passes into the base of transistor 149. Transistor 149 conducts in response to this current. It conducts current from the positive terminal of a 5 volt DC source through a current limiting resistor 154 to ground. When transistor 148 is conducting its collector terminal becomes negative providing the negative stop pulse at the amplifier output 156.

To prevent the sounding pulse or sound wave from being passed through the amplifier during the time the transmitting transducer 60 is sounding, amplifier 64 is blanked by the negative XCTR signal appearing at point 158. At this time, instead of current flowing to the base of transistor 149 when transistor 148 is conducting, the current flows through a shunting diode 160 to the transmitter flip-flop 40 and from there to ground. The threshold voltage of diode 150 prevents any current from building up a voltage on the base of transistor 149 when the negative XCTR signal is present. In addition, the base of the transistor 148 is connected through resistor 162 to provide a current path for any voltage that might build up on the base of the transistor due to intrinsic transistor effects such as leakage currents.

Figure 8:
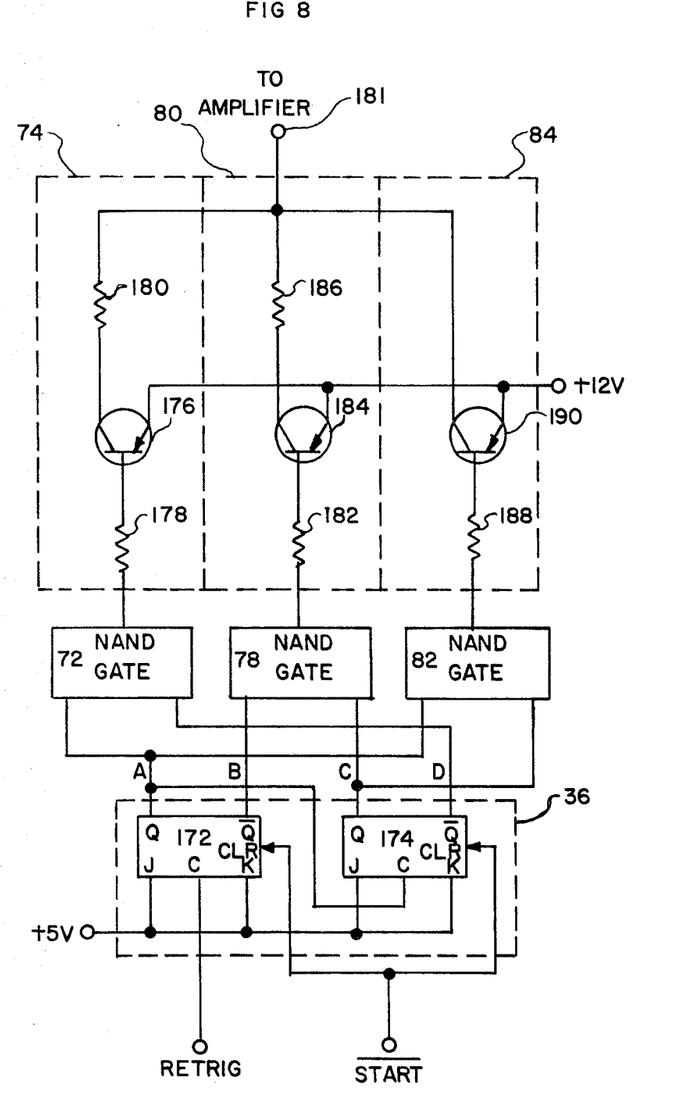
FIG. 8 is an electrical schematic of the automatic gain section of the system.

Turning now to the automatic gain, as stated, its general operation is to automatically increase the gain of amplifier 64 in three discrete levels, from the minimum or base gain level of the amplifier. For various depths and types of ocean bottoms, the minimum required gain normally varies and for this reason the automatic gain circuitry is reset to the lowest gain after each display and is increased sequentially, if necessary, until the minimum gain required to receive the echo signal for each new sounding is attained.

This operation is performed to advantageously prevent unwanted signals from being detected and displayed due to a bed of seaweed, school of fish, water temperature layer, and the like. For example, assume that the vessel passes over a bed of seaweed. When the amplifier is at the minimum gain level necessary to detect the echo signal from the sea floor it will reject the signal from the seaweed as a weaker signal than that from the sea floor. If, however, the automatic gain system were not available and a gain level was set manually greater than what was required, the seaweed would be detected and displayed since its echo signal occurs before the signal from the sea floor.

The automatic gain circuitry will now be described in greater detail by referring to FIG. 8.

As described above, the gain of amplifier 64 is determined by potentiometer 123 (FIG. 7); the gain is increased as the resistance between the potentiometer center tap and point 142 which is connected to the positive lead of the 12 volt DC power source is decreased. When the gain sensitivity control switch 24 is positioned to incorporate the automatic gain into the system, the center tap of potentiometer 123 is at point 140 for minimum gain and the electrical resistance from point 140 to 142 is decreased automatically in three discrete steps by the automatic gain circuitry.

Gain counter 36 of the automatic gain comprises two JK flip-flops, 172 and 174, conventionally connected in toggle configuration to produce the two-stage gain counter 36 having four states. Flip-flop 172 receives the retriggering pulses from counter 50 and flip-flop 174 is driven by output A of flip-flop 172. It should be noted that any standard JK flip-flop can be employed for flip-flops 172 and 174. In the present system these flip-flops are an integrated circuit, Part Number SN7473N, manufactured by Texas Instruments, Incorporated and described on page 6005 of their Integrated Circuits Catalog as a dual JK flip-flop. The four output states are used to create a minimum gain level and three discrete gain increase levels in amplifier 64.

The J & K terminals of the flip-flops are connected to the positive terminal of a 5 volt DC source and the clear terminals are connected to the output of signal generator 32 to receive the negative start pulse ($\overline{start}$) which resets the flip-flops on gain counter 36. The four outputs of the flip-flops, designated A, B, C and D, are connected to NAND gates 72, 78 and 82 as shown.

For automatic gain operation, amplifier 64 is set for a minimum or basic gain level by setting switch 24 in the automatic position as described. The amplifier will remain at minimum gain providing that this gain level is adequate to properly receive a transmitted sound wave to stop counters 46, 48 and 50. If the gain is insufficient to perform this function these counters will not be stopped at the appropriate time and will eventually count up to its maximum number (999) and generate the retriggering pulse from counter 50 as previously stated. The retriggering pulse initiates a new sound wave transmission from the transducer, resets counters 46, 48 and 50 and changes the state of the automatic gain counter 36 to the first gain state. This state provides a positive signal at both the A and D outputs of counter 36 causing NAND gate 72 to emit a negative signal designated a first negative gain signal to the first gain level circuit 74 of the automatic gain circuitry. The first gain level circuit includes a PNP transistor 176 protected by a current limiting resistor 178. When the negative gain signal is presented at the base of transistor 176 and when transistors 114 and 122 (FIG. 6) of amplifier 64 are conducting, transistor 176 conducts current from the positive terminal of the 12 volt DC source through its emitter and collector terminals, through a resistor 180, and then through lead 181 to transistors 114, 122 and then to ground. Since the resistance of 180 is in parallel with the maximum resistance of potentiometer 123, the gain of the amplifier is increased as the total resistance from point 140 to point 142 is decreased.

When gain counter 36 receives the second retriggering pulse, outputs B and C become positive. When these outputs appear at NAND gate 78, a second negative gain signal is produced at the gate's output which is transmitted to a base resistor 182 to the base of a PNP transistor 184 of the second gain level circuit 80.

When the negative gain signal is produced at the base of transistor 184 and when transistors 114, 122 are conducting, transistor 184 conducts from the positive terminal of the 12 volt DC source, through a resistance 186 and then by lead 181 through transistors 114, 122 to ground as described for the first gain level circuit. Resistance 186 is less than the resistance of 180. Therefore, the second gain level of amplifier 64 is higher than the first gain level.

The automatic gain is stepped up to a third gain amplification level in a similar manner. When a third retriggering pulse is received by a counter, the A and C outputs become positive. A negative pulse is then produced at the output of NAND gate 82 which is transmitted through a protecting resistor 188 to the base of PNP transistor 190 of the third gain level circuit 84 as shown. When transistor 190 is conducting, current passes from the positive terminal of the 12 volt DC source to transistors 114, 122 then to ground. Since there is no appreciable resistance between lead 181 and the positive terminal of the 12 volts power source, the gain of the amplifier 64 is increased to its maximum gain level.

Upon receiving a fourth retriggering pulse, the automatic gain is recycled starting again at its minimum gain level. The automatic gain is reset and recycled upon receiving a negative start signal from signal generator 32.

Figure 9:
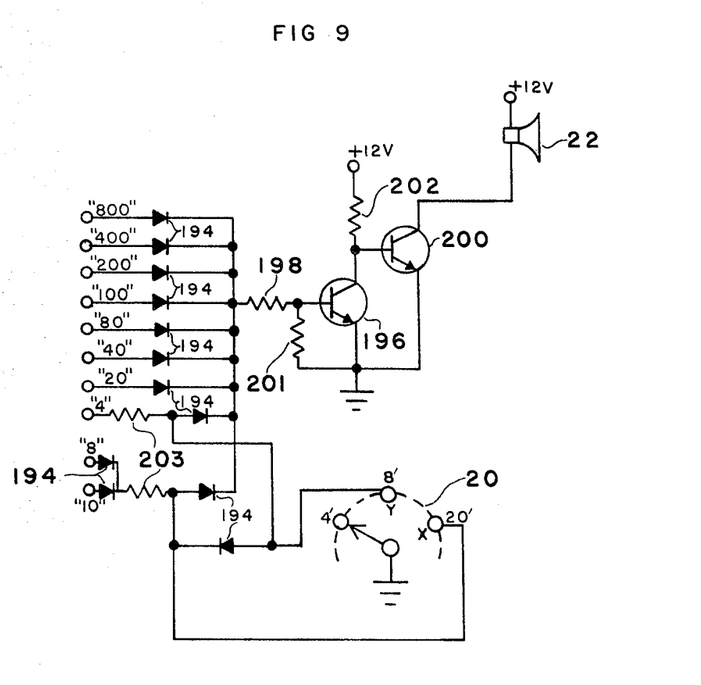
FIG. 9 is an electrical schematic of the depth alarm circuit of the system.

The depth alarm 86 will now be discussed with reference to FIG. 9 of the drawings. The depth alarm includes diodes 194, a first transistor 196 connected to the output of the diodes, a base resistor 198 for protecting transistor 196, a second NPN transistor 200, a temperature compensation resistor 201, a base resistor 202 for protecting transistor 200, current limiting resistors 203 and a buzzer alarm 22 mounted on the main display 10 (and if desired in remote displays 26). The inputs of the depth alarm are respectively connected to the digital outputs "4, 8, 10, 20, 40, 80, 100, 200, 400, 800" as shown, of the counters 46, 48 and 50.

In essence, the alarm system functions in the manner that if no positive signal is presented at any of the inputs, the first transistor 196 remains nonconductive and current from the positive terminal of the 12 volt DC source flows through resistor 202 to the base of transistor 200. At this time, transistor 200 conducts current from plus 12 volt DC to ground through buzzer 22. When a positive signal appears on any of the inputs a current flows to the base of transistor 196 causing it to conduct current from the positive terminal of the 12 volt DC source through resistor 202 through transistor 196 to ground. At this time, current does not flow to the base of transistor 200 and it is cut off. The buzzer 22 then ceases.

It will now be shown how the alarm system may be set to sound the alarm only when the vessel is within a particular depth of water. Switch 20 can be set to sound the alarm system at various depths of water in feet or fathoms, depending upon the frequency rate of oscillator 42. Although only 4, 8 and 20 feet (or fathoms) are shown, it is to be understood that additional depths of water setting may be provided. These settings are provided especially for the use of small pleasure craft. Assuming switch 20 is set at 4 feet (fathoms) of water, and a sound wave is initially transmitted from transducer 60, as the counters begin to count, the buzzer will be activated until the counter counts 4 pulses. If the counter should stop before counting 4 pulses, the buzzer will sound an alarm. After the counter has counted 4 pulses a positive signal is presented at the digital fourth output of the counter and transmitted to the corresponding input of the depth alarm (indicated by the number "4"). This positive signal is transmitted to the base of transistor 196 causing it to conduct. The buzzer is then stopped as transistor 200 is cut off. The digital outputs of the counters connected to the inputs of the depth alarm are selected such that for any depth of water above 4 feet (fathoms) a positive signal will always be presented to the base of transistor 196 thereby assuring that the buzzer is off. For example, at a depth of 50 feet (fathoms) of water, a signal would be presented at both the 40 and 10 inputs.

Assuming that the depth alarm switch is set at the Y or 8 foot (fathoms) level, the 4-input is grounded to prevent the positive signal from the 4-output of counter 46 from reaching the base of transistor 196. Thus, for any depth of water less than 8 feet, even though the digital 4 output of the counter 46 is positive, this positive signal will flow to ground through switch 20 instead of being presented on the base of transistor 196. Thus, transistor 196 remains nonconductive and the buzzer continues to sound even if the counters have counted five pulses or 5 feet (fathoms). If the counters were stopped at any depth of water less than 8 feet, the buzzer would ring. Similarly, as previously described, if the counters are stopped at any feet of water above 8 feet, the buzzer would remain deactivated as a positive signal would appear at one of the inputs.

Finally, if the switch were placed on the 20 foot (fathoms) level, the four, eight and 10 digital outputs of counter 46 are connected through the switch to ground. Any output on these pulses would be directed to ground instead of the base of transistor 196. Therefore, with the switch in this position, 20 pulses must be counted, indicating a 20 foot (fathom) depth of water, before current flows to the base of transistor 196 to disenable the buzzer. If the vessel is in a depth of water less than 20 feet (fathoms), no positive signal will appear at the base of transistor 196 causing transistor 200 to conduct and sound the buzzer.

It is to be understood in all of the above cases that even though the buzzer may be activated while the counter is stepping upwardly in response to the counter pulses, this is accomplished so rapidly that the buzzer instead of having a loud audible signal will merely be a series of sharp clicks. As soon as the counter stops corresponding to a depth of water below that selected by switch 20, the buzzer will ring loudly to sound the alarm.

Figure 10:
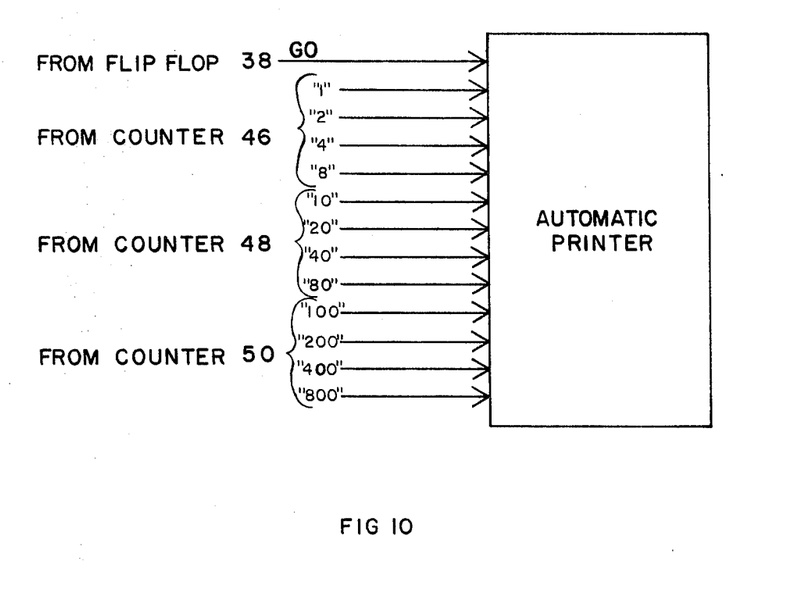
FIG. 10 is a block schematic showing an automatic printer included in the system.

The depth indicator is conveniently adaptable to be utilized with an automatic printer, if desired, in addition to the digital displays. The automatic printer would be connected to the outputs of counters 46, 48 and 50 to enable the printer to print the indicated depth. The automatic printer is connected as shown in FIG. 10.

It should now be evident from the above description that a compact transistorized depth indicator has been provided which indicates the depth of water by a digital display which is exceptionally easy to read and which draws a low current from a standard 12 volt battery. The depth indicator is provided with a number of additional advantageous features. One of these features is the provision of both a transmitting and receiving transducer to prevent residual vibrations of the transmitting transducer from being amplified and presenting spurious signals on the display. Another feature is the provision of an automatic gain which increases the gain of the receiving amplifier simultaneously with the transmission of each sound wave during the recycling of the indicator's system. Another important feature is the provision of an automatic depth alarm which is simply actuated by the output pulses of a counter in response to a particular depth of water. Remote displays may also be utilized with the depth indicator by simply electrically connecting the remote depth displays in parallel with the main displays without the need of mechanical parts such as servo mechanisms. Because, the indicator is comprised of relatively few components which are simple in nature, it is both practical and economically feasible to manufacture.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Now that the invention has been described:

We claim:

1. A depth indicator for measuring the depth of water comprising a signal generator for generating a starting pulse, a start gate energized to a conducting state to cycle the electrical system of the indicator when receiving said starting pulse, a time-base pulse oscillator for generating pulses of a particular frequency correlated to the speed of sound in water, a pulse generating means including a transducer for generating and transmitting a sound wave, means for activating said pulse generating means in response to an oscillator pulse and to a pulse emitted from said start gate, said sound wave passing from the transducer to the bottom of the water to be reflected therefrom, a counter gate, means for energizing said counter gate to a conducting state simultaneously with the transmission of the sound wave in response to the pulse emitted from said start gate and to an oscillator pulse, counters advanced sequentially by oscillator pulses when said counter gate is energized, each of said counters having ten coded outputs representing the numbers 0 through 9 and current flow being sequentially produced at these outputs as said counters are sequentially advanced, an automatic gain including a plurality of gates, said gates arranged to be energized into a conducting state by current flowing from at least one of said outputs of at least one of said counters; a digital display for indicating said depth of water, each display comprising incandescent filaments suitably arranged to illustrate the numbers 0 through 9, means for connecting each of said counter outputs to the display filaments such that in response to current flow at each output of said counters said filaments will be energized to sequentially illustrate the numbers 0 through 9, receiving means including a receiving transducer for receiving the reflected sound wave and amplifying it to a stop pulse, means to deenergize said counter gate upon the emission of said stop pulse from said amplifier, said depth of water being read by said digital display when said counter gate is deenergized, and means for resetting the counters each time a sound wave is generated.

2. The depth indicator of claim 1 wherein said energizing current following from at least one of said counters is designated a retriggering signal, said retriggering signal flowing from the last output of the last of said counters being presented at the input of said start gate to energize said gate into a state of conduction and recycle the system, means responsive to said retriggering signal to sequentially energize said gates into a conducting state, said gates when energized producing a current flow at their outputs, means connecting the output of each of said gates through a resistence to the receiving amplifier for increasing the gain of the amplifier simultaneously with the transmission of the sound wave and means for resetting the automatic gain upon the generation of each starting pulse.

3. The depth indicator of claim 1 wherein a separate transmitting transducer and a separate receiving transducer are provided to reduce the possibility of residual vibrations of the transmitting transducer from being amplified by the receiving means.

4. The depth indicator of claim 1 further including amplifier blanking means to blank the amplifier during each transmission of the sound wave for preventing the sound wave from being emitted from the amplifier.

5. The depth indicator of claim 1 further including blanking means for rendering the display lamps inoperative to prevent them from scrambling when the counters are counting.

6. The depth indicator of claim 1 further including adjusting means to adjust the frequency rate of the time pulse oscillator to 2400 cycles per second to measure a depth of water in feet and to 400 cycles per second to measure a depth of water in fathoms.

7. The depth indicator of claim 1 wherein the system of the indicator is completely transistorized.

8. The depth indicator of claim 1 further including a remote display connected in parallel with the main display for remote viewing.

9. The depth indicator of claim 1 further including depth alarm means for sounding an audible or visible warning when a vessel is within a selected depth of water, said depth alarm means including an alarm connected to the outputs of said counter, said alarm normally activated, and means to deactivate said alarm after said counters are sequentially advanced to a number greater than said selected depth setting.

10. The depth indicator of claim 1 further including a depth alarm for sounding an audible or visual warning when a vessel is within a selected depth of water, said alarm comprising alarm gating means, means connected at the output of said gating means for actuating said alarm, said alarm gating means having an input connected to outputs of said counters, current normally flowing from at least one of said outputs to the input of said alarm gating means as said counters are sequentially advanced, said alarm being inoperative when current is flowing to said input and activated when current is not flowing to said input, and inhibition means in response to a selected depth of water to prevent the current from those counter outputs which are below the selected depth from reaching the input of the gating means.

11. The depth indicator of claim 1 further including an automatic printer for depth printout and said printer being operated by electrical signals from the outputs of said counters.